United States Patent [19]

Saunders

[11] 4,291,130

[45] Sep. 22, 1981

[54] PROCESS OF MAKING THERMOSET FOAMS OF ACRYLIC POLYMERS

[75] Inventor: Frank L. Saunders, Midland, Mich.

[73] Assignee: The Dow Chemical Company, Midland, Mich.

[21] Appl. No.: 109,019

[22] Filed: Jan. 2, 1980

[51] Int. Cl.³ .......................... C08J 9/02; B32B 5/20
[52] U.S. Cl. .................................. 521/136; 428/313; 428/460; 428/463; 521/149; 525/162
[58] Field of Search ............... 521/136, 149; 525/162; 428/313, 460, 463

[56] References Cited

U.S. PATENT DOCUMENTS

| | | | |
|---|---|---|---|
| 3,369,003 | 2/1968 | Verdol | 521/136 |
| 3,422,038 | 1/1969 | Meyer et al. | 521/136 |
| 3,598,770 | 8/1971 | Moore et al. | 521/136 |
| 3,650,995 | 3/1972 | Erickson | 521/136 |
| 3,708,444 | 1/1973 | Gangler et al. | 521/136 |
| 3,714,078 | 1/1973 | Gordon | 521/136 |
| 3,740,357 | 6/1973 | Wax | 521/136 |
| 4,008,293 | 2/1977 | Maska | 260/856 |

FOREIGN PATENT DOCUMENTS

1183152  3/1970  United Kingdom .

Primary Examiner—Morton Foelak
Attorney, Agent, or Firm—Jeffrey S. Boone

[57] ABSTRACT

High density thermoset foams of acrylic polymers are prepared by dry mixing a hydroxy-functional acrylic polymer, e.g., a copolymer of styrene, ethyl acrylate, hydroxy alkyl acrylate and acrylic acid, with a crosslinking agent, e.g., a melamineformaldehyde condensate, and then subjecting the resulting mixture to conditions sufficient to cause the mixture to foam and to crosslink to a thermoset material.

3 Claims, No Drawings

PROCESS OF MAKING THERMOSET FOAMS OF ACRYLIC POLYMERS

BACKGROUND OF THE INVENTION

This invention relates to high density thermoset foams of acrylic polymers and to processes for preparing them. Thermoset foams of acrylic polymers are known to be useful in flotation parts, furniture and a wide variety of other structural applications. Such foams are normally prepared by irradiating acrylic ester copolymers as described in *J. Cellular Plastics*, pp. 38–49 (January, 1967); by polymerizing a terpolymer of acrylonitrile, methacrylic acid and acrylamide with urea in the presence of an azo catalyst as described in British Pat. No. 1,045,229; or by polymerizing acrylic monomer(s) in the presence of aluminum alkyl-oxygen complexes as described in U.S. Pat. Nos. 3,172,868 and 3,293,198.

Heretofore, rigid thermoset foams of acrylic polymers having good heat resistance and solvent resistance have not been prepared by reacting a hydroxy-functional acrylic polymer with an aminoplast resin in the absence of an added blowing agent.

SUMMARY OF THE INVENTION

The present invention is, in one aspect, a heat resistant, thermoset foam derived from a hydroxy-functional acrylic polymer and an aminoplast resin crosslinking agent.

In another aspect, this invention is a process for the preparation of such foam. This process comprises (1) mixing a normally solid, hydroxy-functional acrylic polymer with an aminoplast crosslinking agent and (2) heating the resulting reaction mixture to a heat plastified state until the polymer and crosslinking agent react to form at least one volatile by-product which foams the residual heat plastified mixture which crosslinks to form the thermoset foam.

These thermoset foams, which are solvent resistant as well as heat resistant, are usefully employed as building materials, in furniture, in metal-foam laminates, and the like.

DETAILED DESCRIPTION OF ILLUSTRATIVE EMBODIMENTS

A normally solid, hydroxy-functional acrylic polymer is advantageously a copolymer of at least one alkyl ester of an $\alpha,\beta$-ethylenically unsaturated carboxylic acid such as ethyl acrylate, n-butyl acrylate, methyl methacrylate, diethyl itaconate, sec-butyl acrylate, methyl acrylate and 2-ethyl hexyl acrylate with a hydroxy-functional monomer such as a hydroxy alkyl ester of an $\alpha,\beta$-ethylenically unsaturated carboxylic acid, e.g., hydroxyethyl acrylate, hydroxypropyl acrylate, hydroxyethyl methacrylate and hydroxypropyl methacrylate. This copolymer contains sufficient hydroxyl moiety to react with the aminoplast resin to form a thermoset solvent resistant foam. Usually, the acrylic copolymer contains at least two hydroxyl moieties per copolymer molecule. Preferably it contains from about 0.4 to about 2.5, most preferably from about 0.8 to about 2, milliequivalents of hydroxyl moiety per gram of copolymer. Preferably, the copolymer also contains, in copolymerized form, other ethylenically unsaturated monomers such as monovinylidene aromatic monomers, e.g., styrene, t-butyl styrene, chlorostyrene and bromostyrene; $\alpha,\beta$-ethylenically unsaturated carboxylic acids and anhydrides, e.g., acrylic acid, methacrylic acid, itaconic acid, fumaric acid and maleic anhydride; $\alpha,\beta$-ethylenically unsaturated nitriles, e.g., acrylonitrile and methacrylonitrile; and $\alpha,\beta$-ethylenically unsaturated carboxamides, e.g., acrylamide and methacrylamide. More preferred are copolymers of from about 20 to about 60 weight percent of alkyl acrylate, especially ethyl acrylate or sec-butyl acrylate; from about 20 to about 60 weight percent of styrene, from about 5 to about 30 weight percent of a hydroxypropyl acrylate or hydroxyethyl methacrylate; and from about 1 to about 5 weight percent of methacrylic acid or acrylic acid. Most preferred are copolymers of from about 30 to about 50 weight percent of ethyl acrylate, from about 30 to about 50 weight percent of styrene, from about 10 to about 25 weight percent of a hydroxypropyl acrylate and from about 1 to about 5 weight percent of methacrylic acid. This hydroxy-functional copolymer has sufficient molecular weight to be normally solid under ambient conditions. Preferably, such copolymers have molecular weights such that their solution viscosities (0.5 weight percent copolymer in tetrahydrofuran at 25° C. as described in greater detail hereinafter) are in the range from about 1.1 to about 1.7, most preferably from about 1.12 to about 1.4, centipoise. Generally, these solution viscosities correspond to average molecular weights ($M_w$) in the range from about 25,000 to about 200,000. The hydroxy-functional copolymer is advantageously employed in the form of a colloidal size particulate which is preferably prepared by subjecting an appropriate mixture of the aforementioned monomers to emulsion polymerization conditions as described hereinafter and then drying the resulting latex under vacuum to produce a friable powder of colloidal size particles. The emulsion polymerization is advantageously practiced by charging water to a reaction vessel which is purged with nitrogen. The vessel is heated to about 85° C. and separate streams of catalyst and monomer(s) are fed into the vessel continuously over a four-hour period. Persulfate initiators and alkyl mercaptan chain transfer agents are conveniently employed.

Aminoplast resins which can suitably be employed as the crosslinking agent include amine aldehyde resins, i.e., an aldehyde condensation product of melamine, urea, acetoguanamine or a similar compound. Generally, the aldehyde employed is formaldehyde, although the products can be made from other aldehydes, such as, for example, acetaldehyde.

While resins produced from melamine or urea are most common and are preferred, condensation products of other amines and amides can also be employed, such as, for example, those of triazines, diazines, triazoles, guanidines, guanamines and alkyl and aryl substituted derivatives of such compounds, including alkyl and aryl substituted melamine, provided at least one amino group is present. Some examples of such compounds are N,N'-dimethyl urea, benzyl urea, dicyanodimide, formoguanamine, benzoguanamine, ammeline, 2-chloro-4,6-diamino-1,3,5-triazine, 2-phenyl-4-amino-6-hydroxy-1,3,5-triazine, 3,5-diaminotriazole, triaminopyrimidine, 2-mercapto-4,6-diaminopyrimidine, 2,4,6-trihydrazine-1,2,5-triazine, 2,4,6-triethyltriamine-1,3,5-triazine, 2,4,6-triphenyltriamino-1,3,5-triazine and the like.

These aldehyde condensation products contain methylol or similar alkylol groups, the structure of the alkylol group depending upon the particular aldehyde employed. At least a portion, i.e., all or part, of these alkylol groups should be etherified by reaction with an alcohol. Any monohydric alcohol can be employed for this purpose including such alcohols as methanol, ethanol, propanol, butanol, pentanol, hexanol, heptanol, and other alkanols, usually having up to about 12 carbon atoms, as well as benzyl alcohol and other aromatic alcohols; cyclic alcohols, such as cyclohexanol; monoethers of glycols, such as the cellosolves and carbitols; and halogen-substituted or other substituted alcohols, such as 3-chloropropanol.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

Some of the preferred aldehyde condensation products of melamine include hexamethoxymethyl melamine, hexakis(methoxymethyl)melamine, ethoxymethoxymethyl melamine, hexylated methylated methylol melamine and the like. More preferably, the crosslinking agent is a methoxy methyl substituted melamine-formaldehyde condensate such as the formaldehyde condensate of hexamethoxymethyl melamine wherein the condensate has an equivalent weight from about 130 to about 350, most preferably from 130 to 190.

Preferably, in preparation of the foams of the present invention, a particulate form of the copolymer is first mixed with a crosslinking agent, which is normally liquid. The ratio of copolymer to crosslinking agent used to prepare the blend is one which is sufficient to provide a thermoset foam having a density which is from about 10 to about 50, preferably from about 20 to about 40, weight percent of the density of the blend of copolymer and crosslinking agent prior to the foaming process. Preferably, the ratio of crosslinking agent to copolymer is sufficient to enable the blend to foam according to the standard test procedure described in Example 1 hereinafter. Generally such ratios are from about 1 to about 6 equivalents of crosslinking agent per equivalent of hydroxyl moiety of the copolymer, preferably from about 1 to about 4 equivalents of crosslinking agent. The procedure employed to mix the crosslinking agent with the copolymer is not particularly critical so long as a reasonably uniform mixture of the two components is achieved. Preferably, the copolymer in the form of a colloidal size particulate is combined with the normally liquid aminoplast resin crosslinking agent and thereby plasticizing the copolymer with the crosslinking agent. Alternatively, the copolymer and crosslinking agent are combined by conventional solution mixing techniques wherein one or both ingredients are first dissolved in suitable solvent(s) and then mixed. Solvents suitable for such purpose include cyclic ethers such as tetrahydrofuran, aromatic hydrocarbons such as toluene and xylene, and the like. Following the solution blending procedures, volatile solvents are normally removed before the resultant blend is heated to a temperature sufficient to cause the crosslinking reaction.

When heating the resultant blend of copolymer and crosslinking agent to the crosslinking temperature, it is generally desirable to place the blend in a mold of the desired shape. During the crosslinking reaction, it is a characteristic of the blends used in this invention to produce volatile by-products which cause the blend to expand (foam) to fill the mold. The amount of blend which is employed is determined by the density of the foam required. For example, preferred high density foams having a density in the range from about 0.25 to about 0.1 gram/cc may be obtained with a volume expansion in the range from about 4:1 to about 10:1. Temperatures which are generally effective to cause the desired foaming crosslinking reaction are in the range from about 125° to about 200° C., preferably from about 150° to about 175° C.

In addition to the foregoing critical components, it is understood that other ingredients such as fillers, fire retardants, stabilizers, pigments and the like, can be incorporated into the blend prior to the foaming crosslinking reaction.

The following examples are set forth to illustrate the invention and should not be construed as limiting its scope. In the following examples, all parts and percentages are by weight unless otherwise indicated.

EXAMPLE 1

To an 0.5 liter round bottomed flask equipped with a stirrer, condenser and two addition funnels, is added 150 g of water and 0.4 g of sodium lauryl sulfate. The flask is purged with nitrogen and heated to 90° C. To the flask over a three-hour period, is added (1) a monomer stream consisting of 95 g of styrene, 65 g of ethyl acrylate, 30 g of hydroxypropyl acrylate, 10 g of methacrylic acid and 1.5 g of t-dodecyl mercaptan; and (2) a catalyst stream consisting of 100 g of water, 1.5 g of ammonium persulfate, and 1.5 g of a 28 percent aqueous solution of ammonium hydroxide. After the three-hour addition period, the polymerization is continued at 90° C. for another three hours. The resulting latex has a polymer solids content of 43.3 percent, a pH of 5.4, a Brookfield viscosity (Brookfield LVT viscometer, Spindle No. 1, 60 rpm at 25° C.) of 21 cps and a particle size of 0.1235 micrometer (measured by light dissymmetry). This latex is dried under vacuum at 30° C. to yield a hydroxy-functional copolymer in the form of a colloidal size particulate. Four parts of this copolymer particulate are blended with one part of a melamine formaldehyde condensate crosslinking agent sold by American Cyanamid under the trade name Cymel 303. The crosslinking agent is absorbed by the polymer particles to form a plasticized resin. The resulting plasticized resin is pressed at room temperature into disks (1.27 centimeter diameter×0.64 centimeter thickness). This disk is placed in a round metal container having an inside diameter of 3.3 centimeters and a depth of 0.95 centimeter. The container is then placed in an oven heated to 170° C. and retained in the oven for 10 minutes. The plasticized resin is converted to a foam which fills the container. The foam has a density of 0.12 g per cc, is dimensionally stable at 170° C. and does not dissolve in acetone.

Similar results are obtained when using copolymers of from about 40 to about 47.5 percent of styrene, from about 32.5 to about 40 percent of butyl acrylate or ethyl acrylate, 15 weight percent of hydroxypropyl acrylate or hydroxypropyl methacrylate and 5 percent of methacrylic acid as well as the aforementioned crosslinking agent in amounts ranging from about 10 to about 50 parts of crosslinking agent per hundred parts of copolymer.

EXAMPLE 2

Following the procedure of Example 1, several copolymer latexes are prepared employing different monomers and different amounts of molecular weight control agents as specified in Table I. The resulting latexes are spray dried by diluting the latexes from about 50 percent solids to 25 percent solids and then spray drying the latexes in a BOWENS Laboratory Spray-Aire spray drier operating under the following conditions: heat exchanger oil temperature, 350° F., inlet air temperature, 218° F., outlet air temperature, 115° F. The resulting copolymer particulates are combined with Cymel 303 at a ratio of 62 percent of copolymer, 28 percent of Cymel 303 and foamed according to the procedure specified in Table I. The results of these tests are reported in Table I.

TABLE I

| Sample No. | Copolymer (1) Monomer Type (mole %) | CTA, wt. % | Viscosity (2), cps | Foam (3), mm |
| --- | --- | --- | --- | --- |
| 1 | EA/S/HEA/MA (40/40/15/5) | 0.75 | 1.165 | 22 |
| 2 | EA/S/HEA/MA (40/40/15/5) | 0 | 1.671 | 8 |
| 3 | EA/S/HEMA/MA (40/40/15/5) | 0.75 | Not Determined | 63 |
| 4 | EA/S/HEMA/MA (40/40/15/5) | 0 | | 11 |
| 5 | EA/S/HPA/MA (40/40/15/5) | 0.75 | 1.134 | 43 |
| 6 | EA/S/HPA/MA (40/40/15/5) | 0 | 1.425 | 11 |
| 7* | EA/S/HPA/MA (40/40/15/5) | 1.5 | 1.087 | collapsed |
| 8 | s-BA/S/HPA/MA | 0.75 | 1.128 | 52 |

*Not an example of the invention.
(1) EA = ethyl acrylate
S = styrene
HEA = hydroxyethyl acrylate
MA = methacrylic acid
HEMA = hydroxyethyl methacrylate
HPA = hydroxypropyl acrylate
s-BA = s-butyl acrylate
CTA = t-dodecyl mercaptan
(2) Relative viscosity ($\eta_r$) of copolymer solution - 0.5 percent copolymer in tetrahydrofuran at 25° C. using automated viscosity measuring instrument Model AVS/N, Schott-Gerate Germany with Ubbelohde capillary viscometer (I.D. = 0.46 mm) Schott KPG
(3) A ~0.25 g sample of copolymer/Cymel 303 is placed in a test tube (10 mm × 75 mm). The test tube containing the sample is placed in an oven (150° C.) and retained there for 30 min. The foam height is measured in mm.

As evidenced from the data shown in Table I, foam density can be varied by the amount of chain transfer agent employed with the greater foam densities being achieved at lower quantities of chain transfer agent. As evidenced by the data shown for Sample No. 7, excessive amounts of chain transfer agent reduce the molecular weight of the copolymer to a point that a stable foam cannot be prepared.

EXAMPLE 3

To illustrate the effect of varying the ratio of copolymer to crosslinker, several copolymer/crosslinker blends are prepared using the polymer of Sample No. 5 in Table I, the procedure of Example 1 and different amounts of crosslinker (Cymel 303). The blends are subjected to the foam test described in Table I and the results of these tests are reported in Table II. A control wherein no crosslinker is used is similarly tested and reported in Table II.

TABLE II

| Sample No. | % Crosslinker (1) | Foam Height (2), mm |
| --- | --- | --- |
| 1 | 16.7 | 40 |
| 2 | 28.6 | 63 |
| 3 | 37.5 | 50 |
| 4 | 50 | 52 |
| C* | 0 | 0 (no foam) |

*Not an example of the invention.
(1) Percent of Cymel 303 (as defined in Example 1) based on weight of the copolymer/crosslinked blend.
(2) Same as (3) in Table I.

Similar results are obtained when other melamine formaldehyde condensates such as Cymel 325, sold by American Cyanamid and Uformite MM83, sold by Monsanto, are substituted for the Cymel 303.

EXAMPLE 4

A blend of 72 parts of the hydroxy-functional polymer of Example 2, Sample No. 5, and 28 parts of the crosslinking agent used in Example 1 is formed into a film and placed between two aluminum panels (~0.06 cm thick) separated by a space of ~0.32 cm. The resulting panel composite is placed in a platen press and heated at 150° C. for 30 minutes. The film foams to fill the space between the aluminum panels thereby providing a laminate having a rigid foam core bonded to the aluminum panels.

What is claimed is:

1. A process for producing a thermoset foam consisting essentially of the steps of (1) mixing a normally solid, hydroxy-functional acrylic polymer and an aminoplast resin crosslinking agent and (2) heating the resulting mixture to a heat plastified state until the polymer and crosslinking agent react to form at least one volatile by-product which foams the residual heat-plastified mixture which crosslinks to form the thermoset foam.

2. A process consisting essentially of (1) placing a normally solid hydroxy-functional acrylic polymer and an aminoplast resin cross-linking agent in a mold; and (2) heating said polymer and resin until they have formed a thermoset foamed article.

3. The process of claim 1 or 2 wherein the polymer is plasticized with liquid crosslinking agent and the plasticized polymer is heated to a temperature from about 125° to about 200° C. to form the thermoset foam.

* * * * *